United States Patent [19]
Brown et al.

[11] Patent Number: 5,503,525
[45] Date of Patent: Apr. 2, 1996

[54] PITCH-REGULATED VERTICAL ACCESS WIND TURBINE

[75] Inventors: Kenneth C. Brown, Parkville; Peter J. Meikle, Surrey Hills, both of Australia

[73] Assignee: The University of Melbourne

[21] Appl. No.: 234,653

[22] Filed: Apr. 28, 1994

Related U.S. Application Data

[63] Continuation of Ser. No. 863,298, Aug. 12, 1992.

[51] Int. Cl.⁶ ........................................................ F03D 7/04
[52] U.S. Cl. ............................ 416/24; 416/23; 415/4.4
[58] Field of Search ................................. 415/4.4; 416/23, 416/24

[56] References Cited

U.S. PATENT DOCUMENTS

| | | |
|---|---|---|
| 2,624,531 | 1/1953 | Stalker . |
| 2,625,997 | 1/1953 | Doak . |
| 4,050,246 | 9/1977 | Bourquardez . |
| 4,052,134 | 10/1977 | Rumsey . |
| 4,105,363 | 8/1978 | Loth . |
| 4,137,009 | 1/1979 | Telford . |
| 4,247,251 | 1/1981 | Wuenscher . |
| 4,247,253 | 1/1981 | Seki et al. .................................. 416/23 |
| 4,297,076 | 10/1981 | Donham et al. . |
| 4,383,801 | 5/1983 | Pryor .......................................... 416/24 |
| 4,979,871 | 12/1990 | Reiner . |
| 5,193,978 | 3/1993 | Gutierrez .................................. 416/24 |

FOREIGN PATENT DOCUMENTS

| | | |
|---|---|---|
| 1871388 | 1/1989 | Australia . |
| 2345600 | 6/1975 | France . |
| 860930 | 11/1952 | Germany . |
| 0044972 | 12/1978 | Japan ........................................ 416/24 |
| 1134772 | 1/1985 | U.S.S.R. .................................. 416/24 |
| 2017230 | 10/1979 | United Kingdom . |
| 2029909 | 3/1980 | United Kingdom ...................... 416/24 |

OTHER PUBLICATIONS

Derwent Abstract Accession No. 85-195453/32, SU A, 1134772, Jan. 15, 1985.

Primary Examiner—Edward K. Look
Assistant Examiner—Mark Sgantzos
Attorney, Agent, or Firm—Harness, Dickey & Pierce

[57] ABSTRACT

A cross flow wind turbine comprising a rotor mounted for rotation about a vertical axis and a plurality of blade assemblies mounted on the rotor. Each blade assembly comprises a blade of aerofoil section mounted vertically for pivotal movement about a vertical shaft. The turbine also includes a device for measuring the direction of the apparent fluid velocity, a shaft encoder for measuring the blade angle and a control system to set the blade angle such that the lift component of the aerodynamic forces on the blade contributes positively to the driving torque on the rotor.

11 Claims, 5 Drawing Sheets

TIP-SPEED RATIO -4.5, -6, +7.5

PITCH-REGULATED VERTICAL ACCESS WIND TURBINE

This application is a continuation of U.S. Ser. No. 07/863,298, filed Aug. 12, 1992.

The present invention relates to turbines, and more particularly to wind turbines.

BACKGROUND OF THE INVENTION

The Savonius turbine, Darrieus turbine and the cup anenometer are examples of typical cross-flow wind turbines. A substantial advantage of these turbines is that their vertical axis of rotation makes them insensitive to wind direction. However, as these turbines have blades of fixed orientation fluid flow through the rotor is not always optimal. The performance of these types of turbines at 'off-design' tip-speed ratios is therefore poor. (Tip-speed ratio is defined as the ratio between the blade velocity relative to the ground and the velocity of the free stream relative to the ground i.e. $\Omega R/V_1$). In particular, the Savonius and cup anenometer type turbines suffer large losses and only perform satisfactorily at low tip-speed ratios typically up to about 1.5. The Darrieus turbine on the other hand operates at higher tip-speed ratios typically 3 to 7, but the range of tip-speed ratios for effective operation is narrow and the turbine is not self-starting.

SUMMARY OF THE INVENTION

According to a first aspect of the present invention there is provided a cross-flow wind turbine comprising a plurality of blades of "aerofoil" section mounted for movement along a predetermined path, and means for continually setting the blade and/or a flap on the blade such that the lift component of the aerodynamic force on the blade and flap contributes positively to the driving torque on the rotor.

Preferably, the blades are mounted on a rotor for rotation about a vertical axis.

According to a second aspect of the present invention there is provided a cross-flow wind turbine comprising a rotor mounted for rotation about a vertical axis, and a plurality of blade assemblies mounted on the rotor, each blade assembly comprising a blade of aerofoil section mounted vertically for pivotal movement about a vertical axis, means for measuring at least two of the angles $\phi$, $\alpha$ and $\Psi$ where $\phi$ is the angle of the apparent fluid velocity (as hereinafter defined), $\alpha$ is the angle of attack of the blade (as hereinafter defined) and $\Psi$ is the blade angle (as hereinafter defined), and control means responsive to the measuring means to set the blade such that the lift component of the aerodynamic force on the blade contributes positively to the driving torque on the rotor.

The means for measuring the angle $\phi$ of the apparent fluid velocity may comprise a weathercock mounted for pivotal movement about a vertical pivot axis adjacent the blade. Preferably, the weathercock is mounted on a vertical axis positioned ahead of the leading edge of the blade. Alternatively, the means for measuring the angle $\phi$ of the apparent fluid velocity V may comprise a plurality of pressure measuring devices mounted on the blade and analyzing means for determining the angle of attack $\alpha$ from the pressure measurements together with a means for measuring the blade angle $\Psi$.

According to a third aspect of the present invention there is provided a cross-flow wind turbine comprising a rotor mounted for rotation about a vertical axis, and a plurality of blade assemblies mounted on the rotor, each blade assembly comprising a blade of aerofoil section mounted vertically for pivotal movement about a vertical axis, a flap pivotally mounted on the trailing edge of the blade, means for measuring at least two of the angles $\phi$, $\alpha$ and $\Psi$ wherein $\phi$ is the angle of the apparent fluid velocity (as hereinafter defined), $\alpha$ is the angle of attack of the blade (as hereinafter defined) and $\Psi$ is the blade angle (as hereinafter defined), first control means for setting the blade angle $\Psi$ (as hereinafter defined) substantially to the angle $\phi$ of the apparent fluid velocity (as hereinafter defined) and second control means for controlling the flap angle $\beta$ (as hereinafter defined) such that the flap angle $\beta$ (as hereinafter defined) is positive when the angle $\phi$ of the apparent fluid velocity (as hereinafter defined) is positive and the flap angle $\beta$ (as hereinafter defined) is negative when the angle $\phi$ of the apparent fluid velocity (as hereinafter defined) is negative, whereby the lift component of the aerodynamic force on the blade and the flap contributes positively to the driving torque on the rotor.

Preferably the pivotal flap is mounted immediately adjacent the trailing edge of the blade.

According to a fourth aspect of the present invention there is provided a cross-flow wind turbine comprising a rotor mounted for rotation about a vertical axis, and a plurality of blade assemblies mounted on the rotor, each blade assembly comprising a blade of aerofoil section mounted vertically for pivotal movement about a vertical axis, means for measuring the blade angle $\Psi$ (as hereinafter defined), at least one aerofoil stabilizer fixed to the blade having at least one movable control surface and control means responsive to the angle $\phi$ of the apparent fluid velocity (as hereinafter defined) to change the angle $\tau$ of the movable control surface (as hereinafter defined), the movement in the control surface resulting in a change in the angle of attach $\alpha$ (as hereinafter defined) of the blade, such that the lift component of the aerodynamic forces on the blade and the control surface contribute positively to the driving torque on the rotor.

According to a fifth aspect of the present invention there is provided a cross-flow wind turbine comprising a rotor mounted for rotation about a vertical axis and a plurality of blade assemblies mounted on the rotor, each blade assembly comprising a blade of aerofoil section mounted vertically, a flap pivotally mounted on the trailing edge of the blade, means for measuring the angle $\phi$ (as hereinafter defined) or angle of attack $\alpha$ (as hereinafter defined), and control means for setting the flap angle $\beta$ (as hereinafter defined) as a function of the angle of attack $\alpha$ (as hereinafter defined).

BRIEF DESCRIPTION OF THE DRAWING

Embodiments of the invention will now be described, by way of example only, with reference to the accompanying drawings in which:

FIG. 13 illustrates the relationship between $\beta$ and $\phi$ or $\alpha$ for the blade arrangement shown in FIG. 12.

DETAILED DESCRIPTION OF THE PREFERRED EMBODIMENTS

Figure 1:
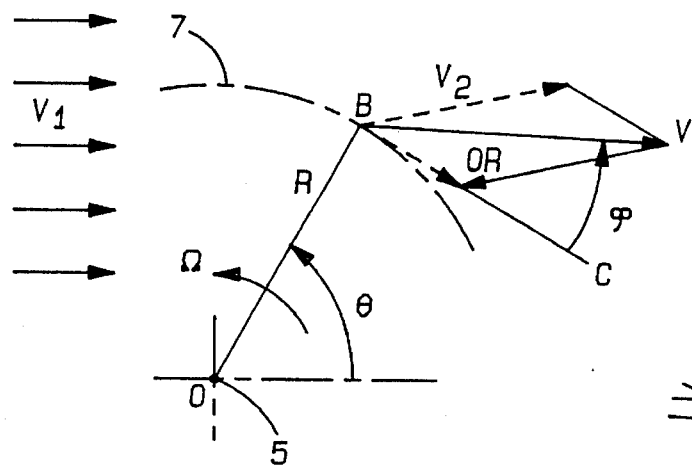
FIG. 1 is a schematic plan representation of a turbine rotor.

FIG. 1 represents schematically an axial view of a turbine rotors rotating with angular velocity $\Omega$. The rotor shaft at O carries a radial arm which supports a blade in bearings at B. The blade is thereby constrained to move on a predetermined circular path or orbit 7 about the rotor shaft. Line OB represents a radial arm of length R whose position relative to the free-stream wind is defined by angle $\theta$. The free stream velocity is shown as $V_1$.

The vector diagram originating at B illustrates that the apparent velocity V of the fluid relative to the blade is the vector sum of the velocity $V_2$ of the fluid relative to the ground and the velocity $V_c$ relative to the blade of the ground ($V_c = \Omega R$).

The apparent fluid velocity V relative to the blade makes an angle $\phi$ to the tangent to the orbit at B, and an angle $\alpha$ to the blade chord. The chord of the blade makes an angle $\Psi$ to the tangent at B. The relationship between $\phi$ and $\Psi$ is:

$$\alpha = \phi - \Psi$$

Figure 2:
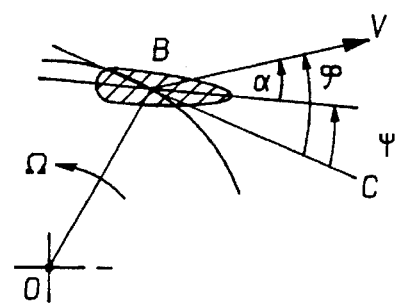
FIG. 2 is a schematic plan representation of a blade illustrating angles $\alpha$, $\phi$ and $\Psi$.

This relationship between the angle of attack $\alpha$, the angle $\phi$ of the apparent fluid velocity V and the angle of the blade $\Psi$ is best shown in FIG. 2. [Note: All angles are considered positive when measured anti-clockwise, as shown in FIG. 2.

The aerodynamic forces on any blade or aerofoil are commonly resolved into two components. These components are the lift component L and the drag component D. By definition the drag component is in the direction of the apparent wind V and the lift component is perpendicular to the drag component. Over the working range of a simple symmetric aerofoil the lift component L is proportional to the angle of attack $\alpha$. Thus the lift component L is zero at zero angle of attack $\alpha$ and changes sign when the angle of attack $\alpha$ changes sign. The lift component L dominates over the effects of the drag component D in most circumstances. The exceptions to this rule occuring, when $\alpha$ is very small, and when $\alpha$ is so large as to be outside the normal working range causing the aerofoil to stall.

Figure 3A:
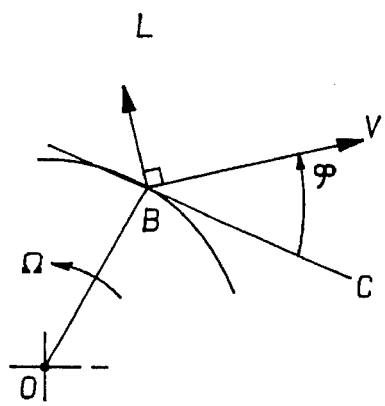
FIGS. 3a and 3b illustrate the lift forces on a blade.
Figure 3B:
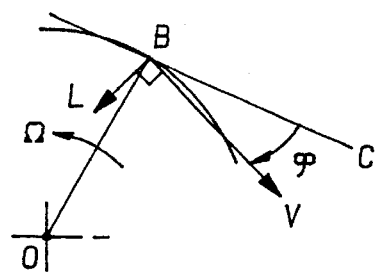

FIGS. 3a and 3b show the lift component L on a blade. With the lift component L as shown in FIG. 3a, the moment about the rotor axis O will be in the same direction as $\Omega$, thereby serving to drive the rotor in the direction of rotation. Furthermore, for any angle $0 < \phi < 180°$ the lift component L will produce a moment in the direction of $\Omega$ and will thereby drive the rotor. Similarly, FIG. 3b shows that for any angles in the range $180 < \phi < 360°$ the lift component L must have the opposite sign in order to drive the rotor. Thus, in order to achieve the objective of having the lift component from the blade drive the turbine, the sign of the lift component L must be controlled. This can be done by altering the angle of attack $\alpha$ of the blade, and/or by the use of blade flaps.

In summary, in order for the lift component L on each blade to contribute positively to the driving torque on the rotor, for the range $-180° < \phi < 180°$, the angle of attack $\alpha$ (or flap angle $\beta$) must change sign when the angle $\phi$ changes sign.

Figure 4:
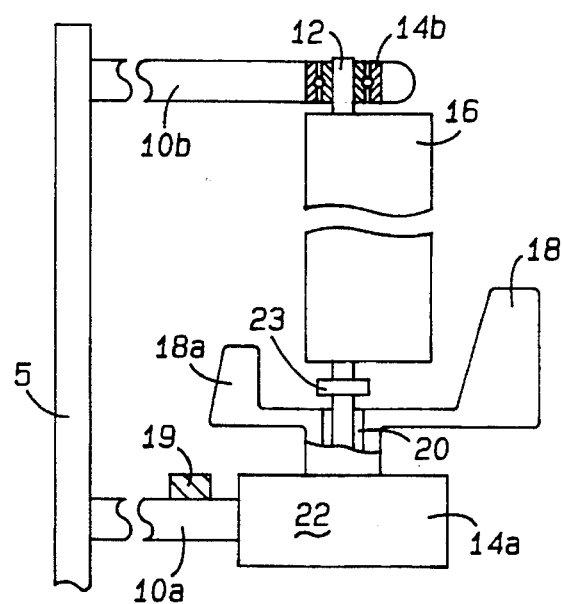
FIG. 4 illustrates a side view of a first embodiment of a blade arrangement according to the invention.

FIG. 4 illustrates a blade arrangement for a turbine that operates to control the blade angle of attack $\alpha$ and make it dependent upon the direction $\phi$ of the apparent fluid velocity V. A rotor shaft (not shown) carries radial arms 10a, 10b which support a vertical shaft 12 in bearings 14a, 14b. Blade 16 is rigidly mounted on shaft 12 which is free to pivot about a vertical axis through bearings 14a, 14b. A weathercock 18 supported in bearing 20 is mounted co-axially with the vertical shaft 12. Weathercock 18 is free to pivot about vertical shaft 12 to thereby align itself in the direction $\phi$ of the apparent fluid velocity V. The angle $\phi$ can then be determined by measuring the angle between the weathercock 18 and the arm 10a. The forward aerofoil 18a of the weathercock 18 aerodynamically damps the motion of the weathercock 18. A control system 22 is mounted on radial arm 10a to drive the blade 16 to thereby adjust the angle of attack $\alpha$ of the blade 16. A universal joint 23 on shaft 12 allows the shaft 12 to flex during rotation.

Figure 6:
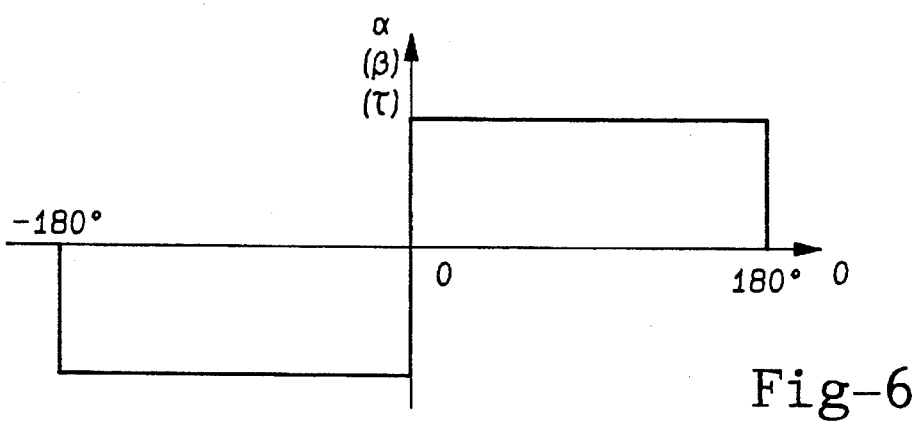
FIG. 6 is a graph illustrating the relationship between angles $\phi$ and $\alpha$, $\beta$ or $\tau$.

During operation, weathercock 18 is used to continuously measure the direction $\phi$ of the apparent fluid velocity V. The blade angle $\Psi$ may be measured by a shaft encoder mounted within the control system 22. Blade angle $\Psi$ and the direction $\phi$ of the apparent fluid velocity V are fed as inputs to the control system 22. The control system 22 uses the simple relationship $\alpha = \phi - \Psi$ to calculate the current blade angle of attack $\alpha$. The control system 22 adjusts the blade angle $\Psi$ to maintain the desired magnitude and sign of the angle of attack $\alpha$ so that the lift component L contributes positively to the driving torque. FIG. 6 illustrates an adequate relationship between the angle of attack $\alpha$ and the direction $\phi$ of the apparent fluid velocity.

In order to minimize the load on the servo motor, both the centre of gravity and the centre of lift of the blade 16 should be close to the axis of the vertical shaft 12.

Weathercock 18 must be carefully balanced with its centre of gravity on its pivot axis otherwise centrifugal forces will prevent its proper operation. The weathercock 18 must also be light and relatively short so that it will react quickly to changes in wind direction. The weathercock 18 as shown in FIG. 4 is of a stylized form only. Alternatively, the weathercock 18 could have a biplane tail which would help keep the tail clear of any aerodynamic disturbances resulting from the blade.

Although weathercock 18 has been used to measure the direction $\phi$ of the apparent fluid velocity V this measurement could be obtained by other means. One method seen to be particularly advantageous, involves measuring the pressure at at least three points on the blade surface. This would allow the calculation of both the magnitude and direction of the fluid velocity relative to the blade. In practice, preferably four pressure measurements would be taken on a symmetrical blade. This extra pressure measurement would provide information that would be useful to determine the direction to turn a stalled blade. This method of determining angle $\phi$ is probably only suited to very large turbines but is preferable as it eliminates the need to rely on delicate, light weight weathercocks whose performance may be unreliable. Another method by which the direction $\phi$ of the apparent fluid velocity V could be obtained is by use of a yaw meter 19 mounted on one of the arms.

Figure 5:
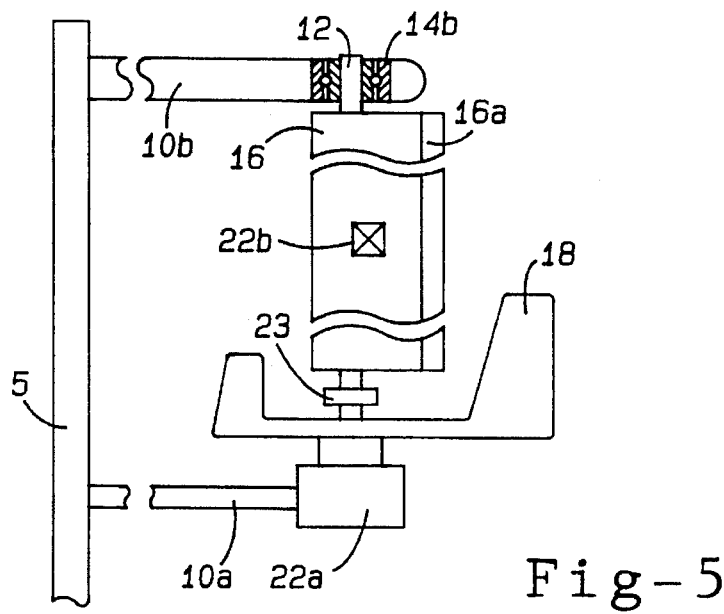
FIG. 5 illustrates a side view of a second embodiment of a blade arrangement according to the invention.

The blade arrangement shown in FIG. 5 is similar to that of FIG. 4 with the exception that the aerofoil or blade 16 has a pivotal aerofoil flap 16a attached to its trailing edge. This type of aerofoil blade 16 with attached flap 16a commonly has its best lift/drag ratio when the aerofoil blade 16 is at approximately zero angle of attack $\alpha$. The turbine illustrated in FIG. 5 takes advantage of this feature in order to separate the control system into two independent parts. The first part of the control system 22a drives the blade 16 to follow the direction $\phi$ of the apparent fluid velocity V with nominally zero angle of attack (ie. $\Psi=\phi$). The second part of the control system 22b, which may be mounted within the blade 16, sets the flap 16a to flap angle $\beta$. The angle $\beta$ is defined relative to the chord line of the blade 16. The magnitude of the flap angle $\beta$ is determined on the basis of the required power output and the sign of angle $\beta$ is identical to the sign of angle $\phi$. FIG. 6 illustrates the relationship between angle $\phi$ and the flap angle $\beta$. Flap 16a thereby ensures that the lift force L on the blade 16 contributes positively at all times to the driving torque on the rotor.

Figure 7A:
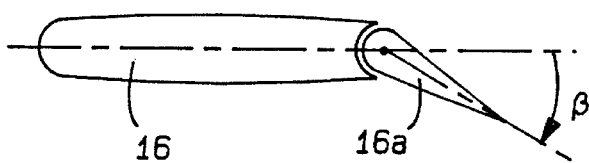
FIGS. 7a and 7b show plan views of flap arrangements suitable for use with the second, third or fourth embodiment of the invention.
Figure 7B:
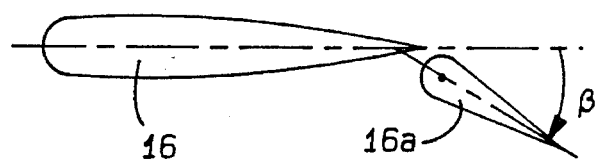
Figure 7C:
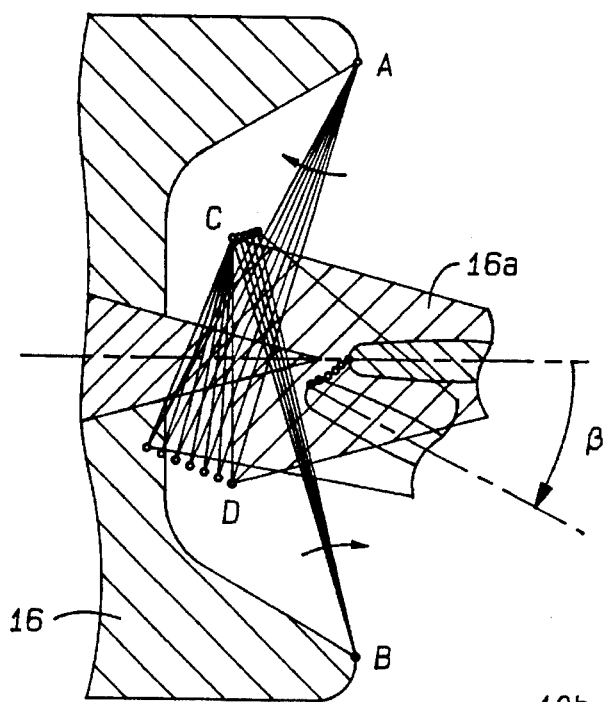
FIG. 7c illustrates a plan view of four bar linkage used to connect the flap to the blade.

The blade arrangement shown in FIG. 5 is structurally more complex than that of FIG. 4 because of the need to incorporate a separate flap 16a. FIG. 7a shows a conventional blade with flap design, typically used for aircraft ailerons. An alternative would be to use a separate aerofoil flap 16a as shown in FIG. 7B. It has been found that the best location for the leading edge of the flap 16a is just under the trailing edge of the blade 16, as shown in FIG. 7b. The problem with this type of flap arrangement is that a simple hinge cannot be used to connect the flap 16a to the blade 16 if the flap 16a is required to move both up and down. A simple four bar linkage illustrated in FIG. 7c will overcome this problem. As shown in FIG. 7c, hinge points A and B are attached to the blade 16 and hinge points C and D are attached to the flap 16a. Links AD and BC are rigid links.

Figure 8:
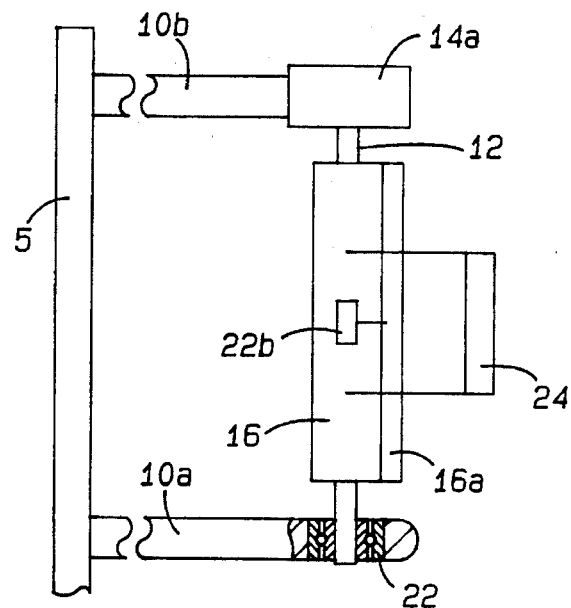
FIG. 8 illustrates a side view of third embodiment of a blade arrangement according to the invention.

The blade arrangement shown in FIG. 8 is similar to the blade arrangement of FIG. 5 with the exception that a stabiliser in the form of a fixed tail or stabilizer 24 is mounted directly to the blade 16. The flap/blade arrangement can be either of the arrangements shown in FIGS. 7a, 7b. The blade 16 is set to zero angle of attack $\alpha$ by means of fixed tail 24. Blade 16 thereby follows the direction $\phi$ of the apparent fluid velocity V.

As with the weathercock 18, a forward canard aerofoil may be useful to increase the aerodynamic damping. Control system 22 measures the blade angle $\Psi$ and uses the approximation $\phi=\Psi$ to determine the direction $\phi$ of the apparent fluid velocity V. The magnitude of the flap angle $\beta$ is determined on the basis of the required power output and the sign of angle $\beta$ is identical to the sign of the angle $\phi$. The desired relationship between angle $\beta$ and angle $\phi$ is shown in FIG. 6. Control system 22b may be mounted within blade 16 and adjusts the flap angle $\beta$ such that the lift force L serves to drive the rotor.

Figure 9:
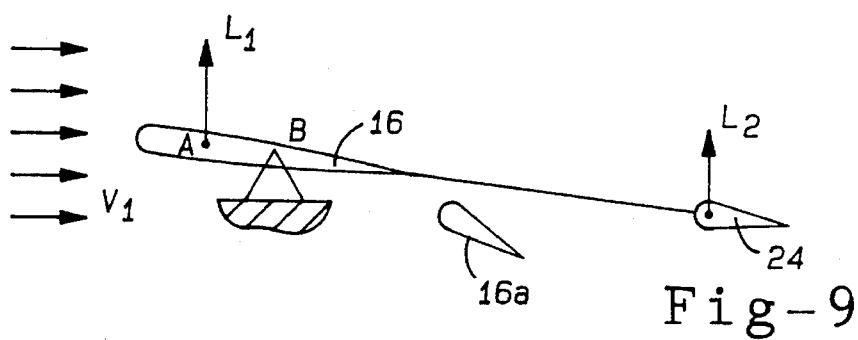
FIG. 9 illustrates the lift forces on the blade arrangement shown in FIG. 8.

FIG. 9 illustrates the lift force L on the blade arrangement shown in FIG. 8. Point B is the pivot axis of the blade 16 and point A is the centre of lift of the blade 16 and the flap 16a but without its associated tail 24. With this type of blade arrangement, the centre of lift A would advantageously be in front of the pivot point B and thus the lift component $L_1$, on the blade 16 and the flap 16a combined, and the lift component $L_2$, on the tail 24 are both positive and both serve to drive the rotor.

A refinement to the blade arrangement shown in FIG. 8 involves the addition of a servo control system to detect the angular acceleration of the blade 16. The control system would then apply a torque to the blade 16 proportional to the angular acceleration thus compensating for the effects of the inertia of the blade 16. Furthermore such a control system may also be used to compensate the aerodynamic damping of the blade 16. These control systems would dramatically improve the response of the blade 16 to changes in wind direction.

Figure 10:
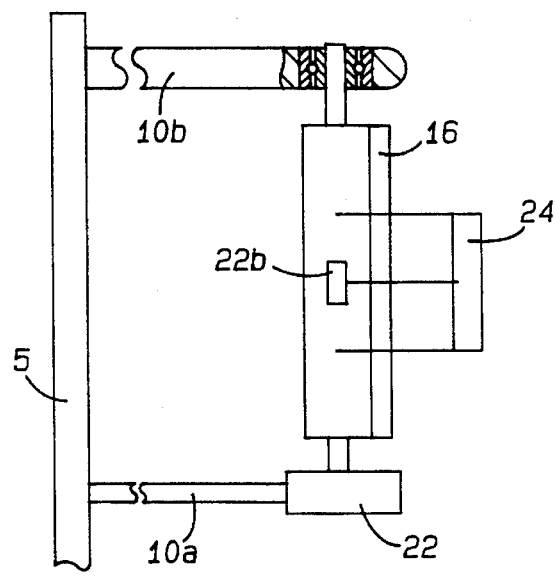
FIG. 10 illustrates a side view of fourth embodiment of a blade arrangement according to the invention.
Figure 11:
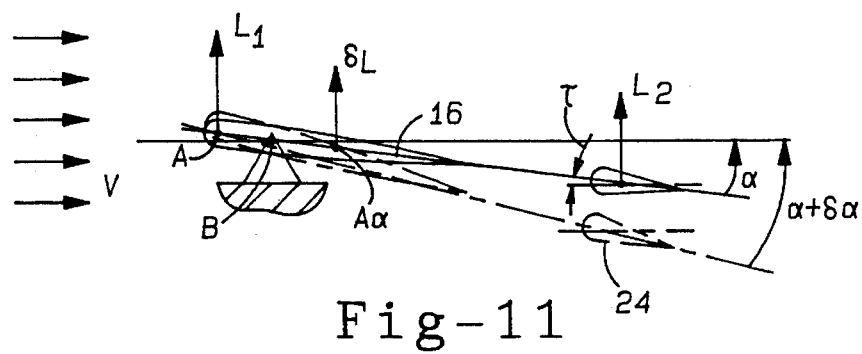
FIG. 11 illustrates a statically stable blade.

FIG. 10 illustrates another blade arrangement for a turbine according to the present invention. The blade arrangement is similar to that of FIG. 8 however with this arrangement there is no flap 16a. The blade comprises more than one aerofoil and at least one of the aerofoils must be movable to change the decalage $\tau$. The decalage angle $\tau$ is defined as the angle between the chord lines of the aerofoil control surface 24 and the aerofoil blade 16, see FIG. 11. The intention of this design is to allow the aerodynamic forces on the blade 16 and the tail 24 to maintain the blade 16 at an angle of attack $\alpha$ in accordance with FIG. 6. As the angle of attack $\alpha$ must change sign according to the direction $\phi$ of the apparent fluid velocity V, the decalage angle $\tau$ of the movable aerofoil tail 24 must be controlled by a mechanism with an input $\phi$ and an external signal identifying the desired magnitude of the angle of attack $\alpha$. Control system 22b may be mounted in the blade 16 to drive the tail 24. Tail 24 may alternatively be in the form of a fixed stabilizer and a moving 'elevator' control surface. A shaft encoder or similar device would measure the blade angle $\Psi$.

In order for the blade arrangement of FIGS. 8 and 10 to be statically stable, the aerodynamic center $A_s$ of the combined blade 16 and tail 24 (FIG. 11) must be behind the pivot point B of the blade 16. This will ensure that, if the angle of attack $\alpha$ of the blade 16 is increased from its equilibrium position to $\alpha+\delta\alpha$, the additional lift component $\delta L$ acting through the aerodynamic centre A will result in a moment about B tending to restore blade 16 to its equilibrium position.

With turbines of the type shown in FIG. 10 it is easier to measure the blade angle $\Psi$ than the direction $\phi$ of the apparent fluid velocity V. The approximation $\phi=\Psi$ may then be used to determine the direction $\phi$ of the apparent fluid velocity V. The relationship between the angle $\tau$ of the moving stabilizer or control surface and the blade angle $\Psi$ is as shown in FIG. 6.

The tail 24 used to control the blade lift must be moved twice per rotor revolution, at $\phi=0°$ and $\phi=\pm180$ °. That is, each time the decalage angle changes from $+\tau$ to $-\tau$, or from $-\tau$ to $+\tau$. A simple cam mechanism could be used to move the blade. Alternatively, a simple hydraulic or electric mechanism could be used. These later systems would be preferred as the energy required could be drawn from an external source.

A refinement to the turbine shown in FIG. 10 is to include the additional servo-control system as described previously with respect to the arrangement shown in FIG. 8.

Australian Patent 522160 to Telford describes a turbine arrangement somewhat similar to that shown in FIG. 10. However with Telford's blade arrangement the pivot B is placed ahead of the centre of lift A of the blade 16, whereas in the present invention the centre of lift A is in front of the pivot B. Telford's arrangement results in a positive lift component $L_1$ on the blade and a negative lift component $L_2$ on the stabilizer. The sum of the two lift components produces a resultant lift component L which acts at the blade pivot point B. This is contrary to the blade arrangement of the present invention, where there is a positive lift component on both the tail 24 and the blade 16 resulting in better blade lift/drag ratios.

Figure 12:
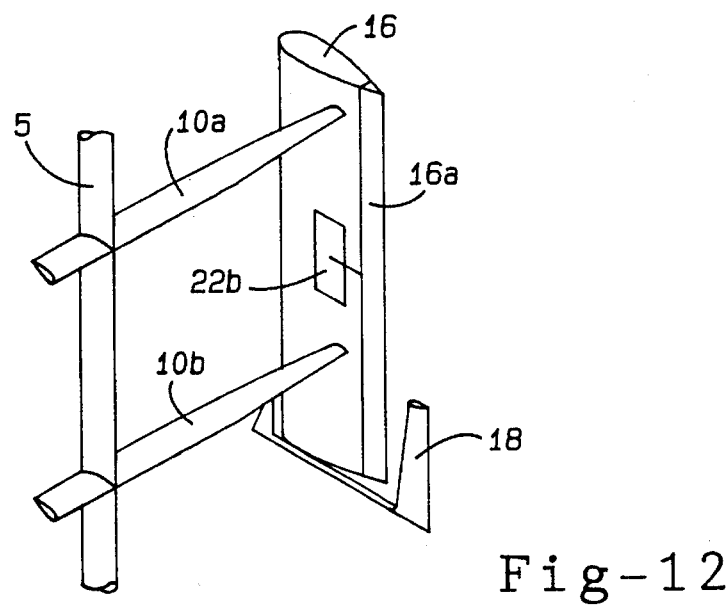
FIG. 12 illustrates a perspective view of fifth embodiment of a blade arrangement according to the invention.
Figure 14:
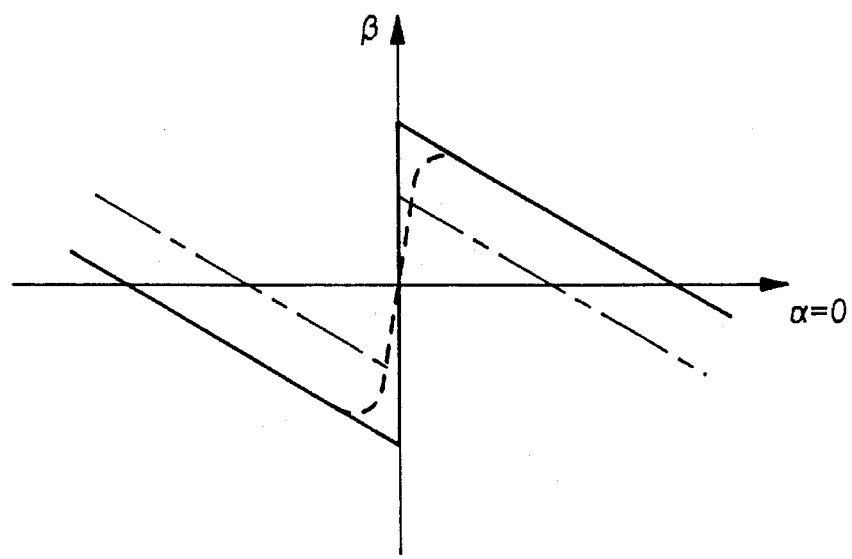
FIG. 14 illustrates approximately how $\alpha$ varies with the tip-speed ratio and angle $\theta$.
Figure 14:
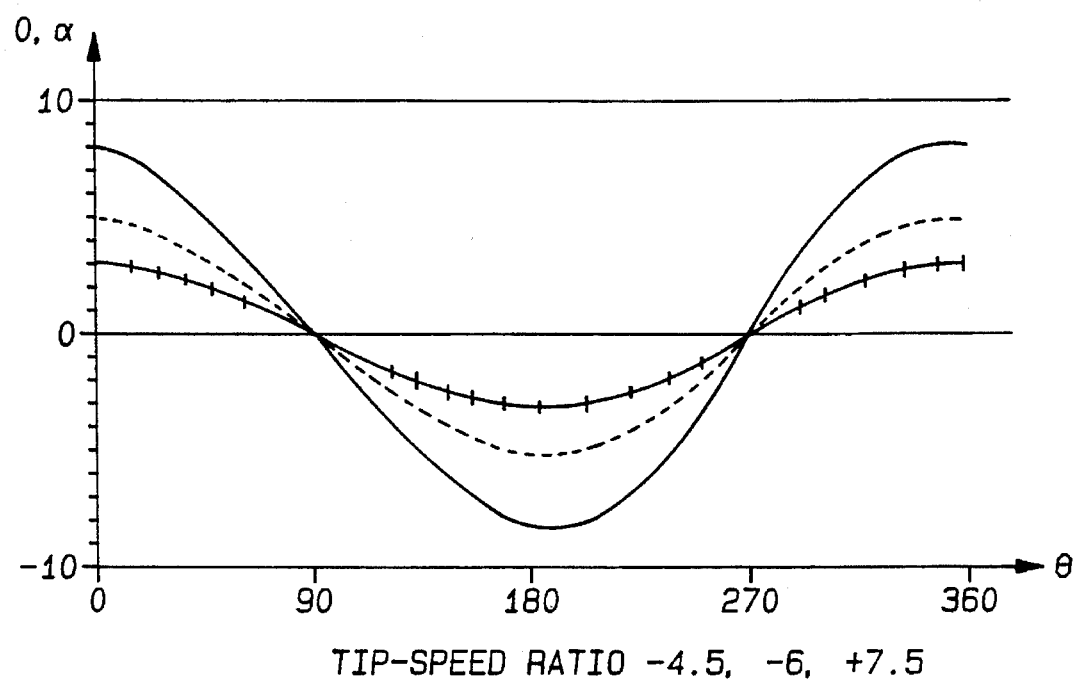

FIG. 12 illustrates a blade arrangement for a turbine which is similar to the Darrieus turbine. However, the turbine has both an improved performance and operates over a broader tip-speed ratio range. (Tip-speed ratio is the ratio between the blade velocity relative to the ground and the velocity of the free stream relative to the ground ie. $\Omega R/V_1$). As shown in FIG. 10, the blade 16 is fixed to radial arms 10a, 10b such that the chord of the blade 16 is tangential to its orbit about the rotor shaft. The direction $\phi$ of the apparent fluid velocity V is determined by the weathercock 18. FIG. 14 illustrates approximately how the angle $\phi$ of the apparent wind velocity V varies with the tip-speed ratio and angle $\theta$. Since the blades 16 are fixed with their chord tangential to their orbit, the angle of attack $\alpha$ of the blade is equal to $\phi$, the direction of the apparent fluid velocity V (i.e. $\alpha=\phi$ and $\Psi=0$).

It should be noted that with a conventional Darrieus rotor at low tip speed-ratios, the angle of attack $\alpha$ will exceed 15° for some part of the rotor orbit, and thus a simple aerofoil blade, as used on a Darrieus rotor would be expected to stall. Furthermore, at higher tip-speed ratios the angle of attack $\alpha$ is small and so the blade lift L will be small and the lift/drag ratio poor. Thus the blade lift L will contribute little to the rotor torque. The conventional Darrieus rotor therefore stops functioning at low tip-speed ratios because the blades stall, and stops functioning at high tip-speed ratios partly because at such small angles of attack the effects of blade drag outweigh the effects of blade lift. Flap 16a on the rotor overcomes these problems. The flap 16a can be used to increase the blade lift L when the angle of attack $\alpha$ is small, and to delay stall when the angle of attack $\alpha$ is large. The flap angle $\beta$ is set by a servo-system 22b within the blade 16. The approximate relationship between the flap angle $\beta$ and the angle of attack $\alpha$ is shown in FIG. 13. A reasonable criterion for choosing the form of angle $\beta$ as a function of angle $\alpha$ would be to require that the lift-coefficient for the blade 16 remain constant irrespective of the angle of attack $\alpha$ and this would result in the form shown as a solid line in FIG. 13. The chain-dotted line shows the form of the function to be used if less blade lift is required and the dotted line indicates how the function may be modified to avoid the necessity for instantaneous movement of the flap when the angle of attack passes $\alpha=o$.

The disadvantage with this type of blade arrangement is that in some instances it may not self-starting and must be driven up to working speed.

Although all the embodiments of the invention describe the blades as being attached to radial arms which are attached to a central rotor, the blades may alternatively be mounted vertically in a conforming track arrangement and thereby be driven around the track. For clarity reasons and to facilitate a simple explanation of the various embodiments of the invention, the drawings depict a single blade arrangement/assembly attached to a rotor. It will be readily appreciated by those skilled in the art in practice a plurality of blade assemblies would actually be connected to the rotor.

The embodiments have been described by way of example only and modifications are possible within the scope of the invention.

We claim:

1. A cross-flow lift-type wind turbine comprising a rotor mounted for rotation about a first axis, a plurality of blade assemblies connected to the rotor, each blade assembly including a blade having an aerofoil section, said blade being arranged for rotation about a second axis under action of an apparent fluid velocity V, said apparent fluid velocity V relative to said blade making an angle $\phi$ to a tangent of an orbit of said blade at said blade, means for determining the angle $\phi$, and control means responsive to said determining means to set said blade such that a lift component of an aerodynamic force on said blade contributes positively to a driving torque on said rotor.

2. The cross-flow lift-type wind turbine according to claim 1 wherein said blade is mounted for pivotal movement about said second axis and further comprising a flap pivotally mounted on a trailing edge of said blade, said flap extending at an angle $\beta$ to a chord line of said blade, a stabilizer attached to said blade, said stabilizer being arranged to ensure that said blade is maintained at substantially zero angle of attack $\alpha$ and control means for controlling said flap angle $\beta$ such that said flap angle $\beta$ is set as a function of the angle $\phi$.

3. The cross-flow lift-type wind turbine according to claim 1 wherein said blade is mounted for pivotal movement about said second axis and further comprising a flap pivotally mounted on a trailing edge of said blade, said flap extending at an angle $\beta$ to a chord line of said blade, a stabilizer attached to said blade, said stabilizer being arranged to ensure that said blade is maintained at substantially zero angle of attack $\alpha$ and control means for controlling said flap angle $\beta$ such that said flap angle $\beta$ is set as a function of a blade angle $\Psi$, said blade angle $\Psi$ being the angle a chord of said blade makes with said tangent of said orbit of said blade.

4. The cross-flow lift-type wind turbine according to claim 3 wherein said flap angle $\beta$ is set as a function of said angle $\phi$ of the apparent fluid velocity so as to provide a desired output power of the turbine.

5. The cross-flow lift-type wind turbine according to claim 3 wherein said flap angle $\beta$ is set as a function of said blade angle $\Psi$ so as to provide a desired output power of said turbine.

6. The cross-flow lift-type wind turbine according to claim 3 wherein said control means has an input equal to said blade angle $\Psi$ and said control means determines said angle $\phi$ of the apparent fluid velocity V according to an approximation $\phi=\Psi$.

7. The cross-flow lift-type wind turbine according to claims 2, 3, 4, 5 or 6 wherein said control means for controlling said flap angle $\beta$ is mounted within said blade.

8. The cross-flow lift-type wind turbine according to claims 2, 3, 4, 5, or 6 wherein the said blade and said flap in combination have a centre of lift which is positioned forward and in the direction of rotation of the vertical axis about which said blade is mounted to pivot.

9. The cross-flow lift-type wind turbine according to claims 2, 3, 4, 5 or 6 further comprising means to detect an angular acceleration of said blade.

10. The cross-flow lift-type wind turbine according to claim 9 wherein said control means is arranged to apply a torque to said blade proportional to said angular acceleration detected by said detection means so as to compensate for effects of said blades inertia.

11. The cross-flow lift-type wind turbine according to claim 2 wherein said first and second axes extend vertically.

* * * * *

UNITED STATES PATENT AND TRADEMARK OFFICE
CERTIFICATE OF CORRECTION

PATENT NO. : 5,503,525
DATED : April 2, 1996
INVENTOR(S) : Kenneth C. Brown, et al.

It is certified that error appears in the above-indentified patent and that said Letters Patent is hereby corrected as shown below:

Col. 8, line 24, Claim 3: delete "said second" and insert --a vertical-- therefor Signed and Sealed this Twenty-third Day of July, 1996

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,503,525
DATED : April 2, 1996
INVENTOR(S) : Kenneth C. Brown, et al.

It is certified that error appears in the above-indentified patent and that said Letters Patent is hereby corrected as shown below:

```
On the title page, item [54] and column 1, line 1, "ACCESS" should
be --AXIS--
```

Signed and Sealed this

Third Day of September, 1996

Attest:

BRUCE LEHMAN

Attesting Officer    Commissioner of Patents and Trademarks